United States Patent

Ataka

[15] 3,642,360
[45] Feb. 15, 1972

[54] MICROPHOTOGRAPH PROJECTION SYSTEM

[72] Inventor: Hisanori Ataka, Kawasaki-shi, Japan

[73] Assignee: Kabushiki Kaisha Ricoh, Ota-ku, Tokyo, Japan

[22] Filed: July 7, 1969

[21] Appl. No.: 839,561

[30] Foreign Application Priority Data

July 25, 1968 Japan.....................................43/52688

[52] U.S. Cl..................................................353/38, 353/25
[51] Int. Cl. .........................................................G03b 21/00
[58] Field of Search................353/7, 27, 25, 32, 38; 355/40; 352/81

[56] References Cited

UNITED STATES PATENTS

| | | | |
|---|---|---|---|
| 1,874,193 | 8/1932 | Keen | 353/38 |
| 2,699,101 | 1/1955 | Ferguson et al. | 355/40 X |
| 2,823,578 | 2/1958 | Gordon et al. | 352/81 X |
| 2,943,533 | 7/1960 | Goodbar | 352/81 X |
| 2,950,644 | 8/1960 | Land et al. | 352/81 X |

FOREIGN PATENTS OR APPLICATIONS 421,120  12/1934  Great Britain...........................352/81

*Primary Examiner*—Harry N. Haroian
*Attorney*—Burgess, Ryan and Hicks

[57] ABSTRACT

A microphotograph projection system comprising a substantially planar microlens plate having a plurality of microlenses arranged in intimately contacted relation with each other upon the front surface thereof. A plurality of objects or originals to be projected are disposed in one-to-one relation with said microlenses and selected for projecting by aligning a moving elongated slot with an aperture moving in the opposite direction.

5 Claims, 12 Drawing Figures

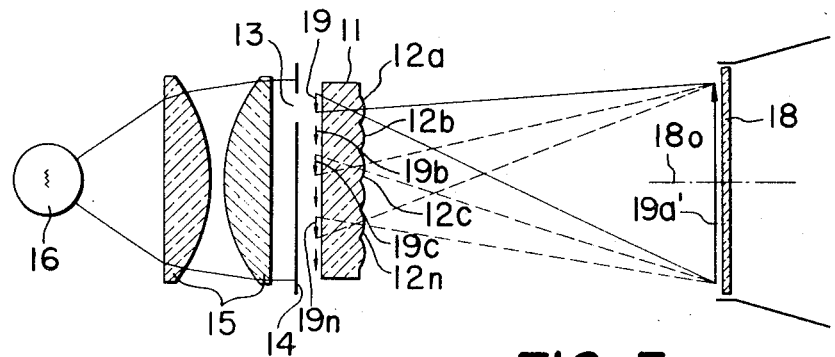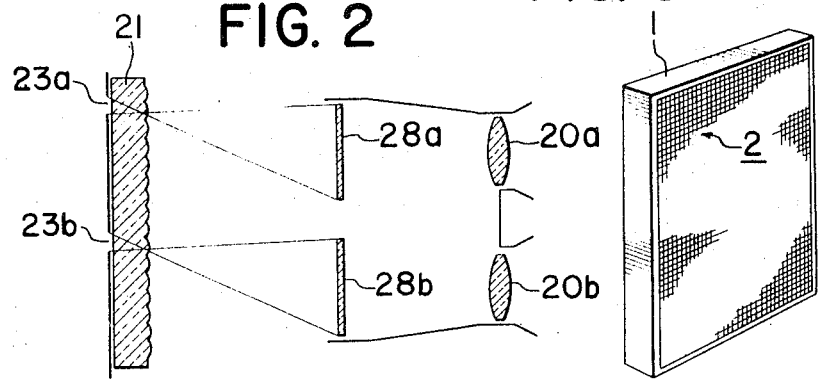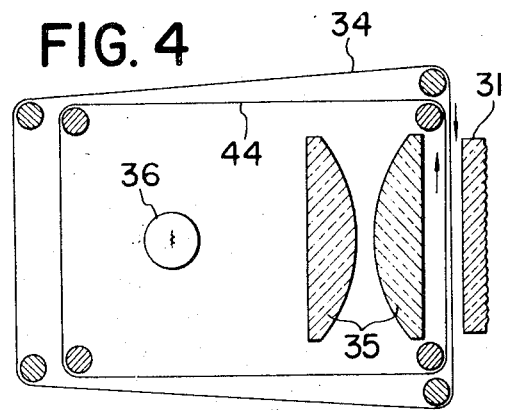

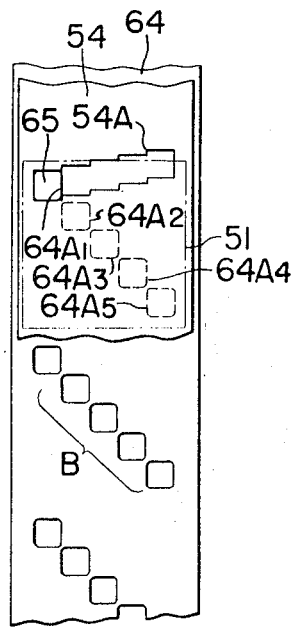
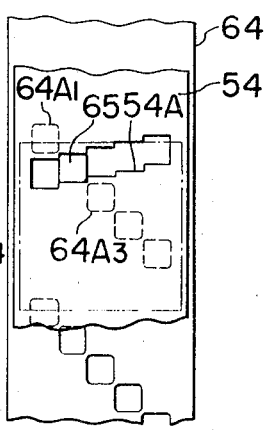
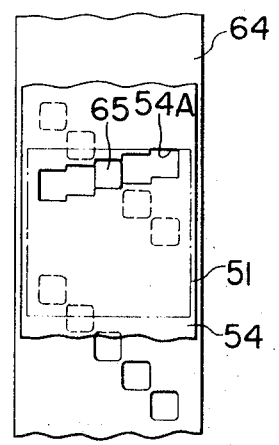
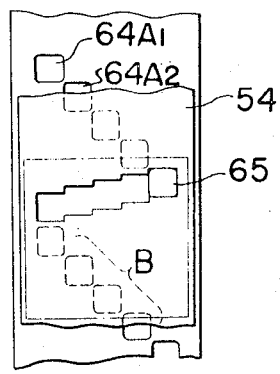
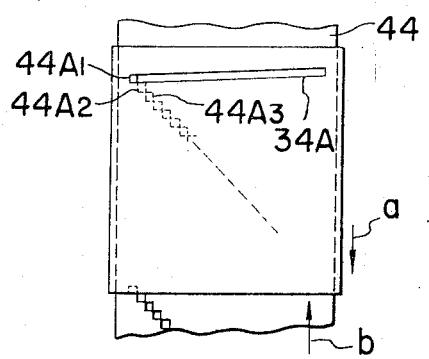

MICROPHOTOGRAPH PROJECTION SYSTEM

BACKGROUND OF THE INVENTION

The present invention relates to an optical projection system and more particularly to an optical projection system for projecting microphotographs or microobjects.

There has been already proposed a projection system of the type described, but the system is complicated in construction with a microlens plate which is curved as a whole in order to focus sharply the objects upon the screen through any microlens upon the microlens plate. However, the fabrication of such curved microlens plates is very difficult. Furthermore, it is also extremely difficult to uniformly apply the photosensitive material upon the curved surface of the microlens plate.

In view of the above, one of the objects of the present invention is to provide a microphotograph projection system simple in construction.

Another object of the present invention is to provide a microphotograph projection system whose microlens plate is substantially made planar as a whole.

A further object of the present invention is to provide a projection system which can project every microphotograph or microobject at a predetermined position upon a screen.

SUMMARY OF THE INVENTION

In brief, a microphotograph projection system according to the present invention is comprising a substantially planar microlens plate having a plurality of microlenses arranged in intimately contacted relation with each other upon the front surface thereof and a plurality of objects to be projected, disposed in one-to-one relation with said microlenses, means for selecting an object or one pair of objects for projection and means for projecting said selected object or pair of objects.

According to one embodiment of the present invention, said object or original image selecting means is consisting of a movable aperture which is formed by the intersection of an elongated slot formed through a first moving band or plate with one of a plurality of square or rectangular apertures formed in a second moving band or plate.

According to another embodiment of the present invention, said object or original selecting means is consisting of a light source which can selectively illuminate only the selected object.

The position of each of the objects or original images with respect to its corresponding microlenses are different depending upon projection means. For example, the center of the image projected upon the screen of one object or original image by its corresponding microlens is deflected outwardly of the centerline of the screen. Alternately, the center of the image projected upon the screen may be made always coincident with the centerline of the screen. In the latter case, in order that every object or original image may be projected at a predetermined place upon the screen, another projection lens is disposed in front of the microlens plate.

According to the present invention, a three-dimensional or stereoscopic image may be viewed. For this purpose a pair of objects or original images for reconstructing a three-dimensional or stereoscopic image are simultaneously projected upon the screen and viewed through a pair of eyepieces. The above and other objects, features and advantages of the present invention will become more apparent from the description of the illustrative embodiments thereof with reference to the accompanying drawings.

BRIEF DESCRIPTION OF THE DRAWING

FIG. 1 is a schematic sectional view of one embodiment of the present invention, FIG. 2 is a schematic sectional view of another embodiment of a three-dimensional or stereoscopic image viewing system according to the present invention, FIG. 3 is a perspective view of one embodiment of a microlens plate used in the present invention, FIG. 4 is a schematic sectional view of one embodiment of an aperture positioning device according to the present invention, FIG. 5 to 9 are front views illustrating the displacement of the aperture, FIG. 10 is a front view illustrating a detailed construction of the aperture plates (of the aperture positioning or setting device shown in FIG. 4)

DESCRIPTION OF THE PREFERRED EMBODIMENTS

Figure 11:
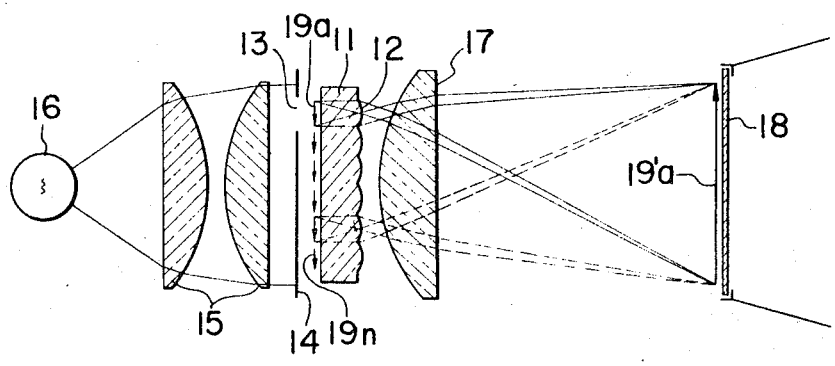
FIGS. 11 and 12 are schematic sectional views of two other embodiments of the present invention respectively.

According to the present invention, the objects or originals to be projected are arrayed at the planar rear or back surface of a transparent microlens plate having a plurality of microlenses arrayed in rows and a, at the front surface thereof, each of the originals being so disposed as to be in one-to-one opposed relation of its corresponding microlens. Therefore it will be understood that the number of originals to be projected may be equal to that of the closely arrayed microlenses upon the front surface of the microlens plate. For example, let it be assumed that upon the front surface 2 of a microlens plate 1 in FIG. 3 be arrayed in 53 rows and 53 columns square microlenses having a side of 1 to 2 mm. Then the number of originals to be projected will reach to $53^2 = 2,809$. The objects or original to be projected may be provided by exposing a photosensitive material of the type in which a photosensitive material is directly coated upon the back surface of a microlens plate, through a photographic apparatus having the optical system similar to that of the present invention and thereafter processing this exposed material. However, an original plate which is independent from the microlens plate and in which are recorded a plurality of images to be projected may be used in the present invention.

FIG. 1 illustrates one embodiment of the present invention in which for the better understanding of the present invention a microlens plate 11 having a small number of microlenses is used. Downwardly pointed arrows $19a, 19b, 19c$ and so on at the back surface of the microlens plate 11 designate the original images to be projected and in opposed relation with their corresponding microlenses $12a, 12b, 12c$ and so on. Backwardly of the microlens plate 11 is disposed an aperture plate 14 having an aperture 13 substantially equal in size to each of the microlenses $12a, 12b$ and so on. The aperture plate 14 may be vertically and transversely or horizontally moved in a plane perpendicular to the axis of each of the microlenses. Backwardly of the aperture plate 14 is disposed a condenser lens 15 and then is disposed a light source 16. A screen 18 made of frosted glass or the like is positioned so that the images may be sharply focused thereupon by the microlens.

When the aperture 13 is located backwardly of the image $19a$, is projected upon the screen 18 as image $19a'$. When the aperture 13 is then displaced so as to oppose the original $19n$, then it is projected upon the same screen 18. That is, the relative position of one original image to be projected with respect to its corresponding projecting microlens is such that when the aperture 13 selects this original image, it is sharply focused upon the screen 18 at a predetermined position. For example, the original image $19a$ is projected upon the screen at a position below the optical axis of the microlens $12a$ while the original image $19n$, at a position below the axis of the microlens $12n$. That is, when the centerline $13o$ of the screen 18 is coaxial with that of the microlens plate 11, each of the original images will be projected upon the screen 18 at such a position deflected from the center line $18o$. The further an original image is located from the center line of the microlens plate 11, the larger the deflection.

When the original images for reproduction of moving images as in the case of cine films are disposed upon the microlens plate 11 and the aperture 13 is sequentially displaced in predetermined order, the moving images may be projected upon the screen. For example, when the number of frames, that is the original images be $53^2=2,809$ and the displacement of the aperture is 16 frames or original images/sec., then moving images may be projected for about three minutes. Instead of the original images, characters, signs or the like may be used while instead of the screen a reader with or without the screen may be used so that the device of the present invention may be advantageously used as a business machine or data processing machine in various fields.

FIG. 2 illustrates the second embodiment of the present invention, that is a three-dimensional image viewing device. In front of a microlens plate 21 are disposed two screens 28a and 28b and eyepieces 20a and 20b spaced apart from each other by a distance corresponding to the length between the eyes. Backwardly of the microlens plate 21 are disposed a pair of apertures 23a and 23b. When a pair of original images for reconstruction of a three-dimensional or stereoscopic image are projected upon the screens 28a and 28b, they can be viewed through the eyepieces 20a and 20b whereby the observer perceives a stereoscopic vision.

FIG. 4 illustrates one embodiment of an aperture positioning or setting device which is movable at the back of the microlens plate 31. The device is comprised of a first endless moving band or plate 34 lapped over four rollers and a second moving band or plate 44 lapped over four rollers inwardly of the first moving plate. The width of each of the moving plates 34 and 44 is made slightly larger than the effective width of the microlens plate 31 and the moving plates 34 and 44 are overlapped with each other between the microlens plate 31 and a condenser lens 35 and moved in the directions indicated by the arrows. That is, they are moved in the opposite directions with respect to each other. As shown in FIG. 10, the first moving plate 34 is provided with a row selection slot 34A formed in slightly inclined relation with the direction perpendicular to the direction of the travel of the moving plate 34. The length of the row selecting slot 34A is substantially equal to the effective length of one side of the microlens plate while the width of the row selecting slot 34A is equal to the length of one side of the microlens. The second moving plate 44 is provided with a plurality of diagonally arrayed column selecting apertures $44A_1$, $44A_2$, $44A_3$ and so on. The number of these column selecting apertures is equal to that of the columns of the microlenses and the dimensions of each aperture is identical with those of the microlenses.

Referring to FIG. 10, the first moving plate 34 is moved in the direction indicated by the arrow a at a velocity slightly slower than that of the second moving plate 44 moving in the direction indicated by the arrow b, that is the direction opposite to that of the first moving plate 34, so that an aperture $44A_1$ formed by the column selecting aperture and the row selecting slot may be sequentially displaced transversely. The ratio of the velocity of the first moving plate 34 to that of the second moving plate 44 may be determined by a number of columns of the microlenses upon the microlens plate. Let it be that the number of columns be N, then the above velocity ratio will become 1/N. For example, when a number of columns (that is, the number of microlenses in one row in FIG. 3) is 53, the displacement of the first moving plate 34 is 1/53 of the displacement of the second moving plate (that is, the distance corresponding to the length of one side of one microlens) upon upward displacement of the second moving plate 44 by a distance corresponding to the length of one side of the microlens. This velocity ratio may be precisely set by selecting a suitable gear ratio of a drive device for moving the moving plates 34 and 44.

FIGS. 5 to 9 are for explanation of the displacement of an aperture upon a microlens plate 51 having five rows and five columns of microlenses respectively. These figures will help one understand the function of the device shown in FIG. 10. FIG. 5 shows the formation of an aperture 65 at a position corresponding to the leftmost position in the first row of the microlenses by the row selecting slot 54A of the first moving plate 54 and the row selecting aperture $64A_1$ of the second moving plate 64. FIG. 6 shows that the first moving plate 54 is displaced downwardly by a distance corresponding to 1/5 of the displacement of the second moving plate 64 while the latter is moved upwardly by a distance corresponding to a length of one side of one microlens so that the aperture 65 is formed by the aperture $64A_2$ at the second position from the left of the first row of the microlenses. FIG. 7 shows the aperture 65 formed by the aperture $64A_3$ at the third position from the left of the first low. FIG. 8 shows the aperture 65 formed at the right end of the first row by the aperture $64A_5$.

After completion of the apertures in the first row, a second aperture group B having the apertures similar in size and arrangement with those of the first group A consisting of the apertures $64A_1$, $64A_2$, $64A_3$ and so on cooperates with the row selecting slot 54A so that the apertures are sequentially formed from the left end of the second row of the microlenses. When the right end of the row selecting slot 54a is displaced to the fifth row, all of the original images (25 frames) have been accomplished. The above described row selecting slot 54A has stepped sides, which may be applied only when the dimensions of a microlens are larger. When one side of the microlens is of the order of 1 to 2 mm., and when there are many rows and columns, the sides of the row selecting slot 54A may be made straight as shown in FIG. 10.

FIG. 9 shows the state in which the lower half of the aperture $64A_1$ and the upper half of the aperture $64A_2$ are viewed through the row selecting slot, that is the state in which the aperture is moving from the first to second positions. In case of the moving image projection, one projected image is formed by the original images through said two upper and lower halves of the apertures. When the originals to be projected are characters, signs or the like so that it is not desired that the two adjacent characters, signs or the like are projected partially upon the screen, a suitable mechanism for interrupting the illumination light during such transient state as described above may be used. It will be noted that a light source means may be used which selectively illuminates only a desired original image to be projected, thereby eliminating the aperture positioning device as described above.

Figure 12:
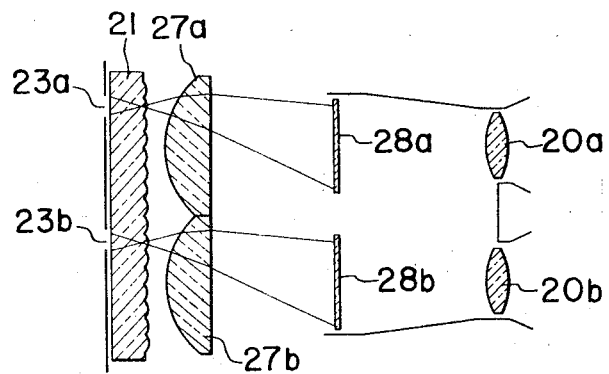

FIGS. 11 and 12 illustrate further embodiments of the present invention. The embodiment shown in FIG. 11 is similar to that shown in FIG. 1 but a projection lens 17 is disposed in front of the microlens plate while the embodiment shown in FIG. 12 is similar also to that shown in FIG. 2, but projections lenses 27a and 27b are disposed in front of the microlens plates. In FIG. 12, reference numeral 23a and 23b designate a pair of apertures; 28a and; 28b, a pair of screens; and 20a and 20b, a pair of eyepieces.

The embodiments shown in FIGS. 11 and 12 are especially advantageous when it is desired to project every original image upon a predetermined position on the screen, opposed to the embodiments shown in FIGS. 1 and 2 wherein the images are projected at different positions upon the screen.

I claim:

1. A microphotograph projection system comprising
a microlens plate having front and back surfaces with a plurality of microlenses closely arranged upon the front surface thereof, and the objects to be projected disposed in opposed relation respectively with corresponding microlenses upon the back surface thereof, the microlens plate having a planar configuration;
means for selecting one of said objects for projection; and
means for projecting said selected object;
said selecting means comprising a pair of first and second moving belts and an aperture formed in one of said belts;
said aperture being formed by an elongated row selecting slot formed within said first moving belt at an angle relative to the direction of movement of said first moving belt, and a plurality of column selecting apertures is formed within said second moving belt diagonally relative to the direction of the movement of said second moving belt.

2. A projection system as claimed in claim 1 wherein said row selecting slot formed within said first moving belt is slightly inclined relative to the direction perpendicular to said direction of the movement of said first moving belt.

3. A projection system as claimed in claim 1 wherein said row selecting slot has stepped sides.

4. A projection system as claimed in claim 1 wherein said microlens plate has a plurality of pairs of objects formed upon the back surface thereof, each pair being projected simultaneously for reconstruction of a three-dimensional image; and a pair of said objects selecting means, a pair of said projection means and a pair of eyepieces are provided.

5. A projection system as claimed in claim 1 wherein said first and second moving belts are moved in opposite directions relative to each other an in overlapped relation with each other, said elongated row slot having a length substantially equal to the effective length of one side of said microlens plate and a width substantially equal to a length of one side of said microlens, the other moving plate having a plurality of column selecting apertures arranged in the direction corresponding to that of the diagonal of said microlens plate, each of said plurality of column selecting apertures being substantially equal in size to the microlens, whereby the object to be projected may be selected by an aperture formed by the intersection of said row selecting slot with one of said plurality of column apertures.

* * * * *